(12) United States Patent
Criel (10) Patent No.: US 11,421,825 B2
(45) Date of Patent: Aug. 23, 2022

(54) PRESSURE VESSEL (71) Applicant: Plastic Omnium Advanced Innovation and Research, Brussels (BE)

(72) Inventor: Bjorn Criel, Sint-Martens-Lennik (BE)

(73) Assignee: PLASTIC OMNIUM NEW ENERGIES FRANCE, Lyons (FR)

( * ) Notice: Subject to any disclaimer, the term of this patent is extended or adjusted under 35 U.S.C. 154(b) by 0 days.

(21) Appl. No.: 16/628,412

(22) PCT Filed: Jul. 3, 2018

(86) PCT No.: PCT/EP2018/067988
§ 371 (c)(1),
(2) Date: Jan. 3, 2020

(87) PCT Pub. No.: WO2019/007978
PCT Pub. Date: Jan. 10, 2019

(65) Prior Publication Data
US 2020/0158286 A1    May 21, 2020

(30) Foreign Application Priority Data

Jul. 6, 2017 (EP) .................................. 17180105

(51) Int. Cl.
*F17C 1/06*    (2006.01)
*F17C 1/16*    (2006.01)

(52) U.S. Cl.
CPC .................. *F17C 1/06* (2013.01); *F17C 1/16* (2013.01); *F17C 2201/0109* (2013.01);
(Continued)

(58) Field of Classification Search
CPC ...... F17C 1/06; F17C 1/16; F17C 2201/0109; F17C 2201/056; F17C 2203/0604;
(Continued)

(56) References Cited

U.S. PATENT DOCUMENTS

| 3,112,234 A | 11/1963 | Krupp | |
| 3,815,773 A * | 6/1974 | Duvall | ...................... F17C 1/16 220/590 |
| 2004/0173618 A1* | 9/2004 | Suzuki | ...................... F17C 1/16 220/581 |

FOREIGN PATENT DOCUMENTS

| CN | 2458481 Y | 11/2001 |
| CN | 1749632 A | 3/2006 |

(Continued)

OTHER PUBLICATIONS

International Search Report dated Sep. 5, 2018 in PCT/EP2018/067988 filed on Jul. 3, 2018.
(Continued)

*Primary Examiner* — Javier A Pagan
(74) *Attorney, Agent, or Firm* — Oblon, McClelland, Maier & Neustadt, L.L.P.

(57) ABSTRACT

The invention relates a pressure vessel (100) configured for storing a fluid under pressure, said pressure vessel comprising: a thermoplastic liner (40) having a cylindrical section (41), a first rounded end section (42) and a second rounded end section (42); a reinforcement structure (50) made of a composite material, said reinforcement structure surrounding at least the cylindrical section of the thermoplastic liner; and a local reinforcement layer (20).

20 Claims, 5 Drawing Sheets (52) U.S. Cl.
CPC .................. *F17C 2201/056* (2013.01); *F17C 2203/0604* (2013.01); *F17C 2203/0619* (2013.01); *F17C 2203/0673* (2013.01); *F17C 2205/0305* (2013.01); *F17C 2209/2154* (2013.01); *F17C 2221/012* (2013.01); *F17C 2221/033* (2013.01); *F17C 2223/0123* (2013.01); *F17C 2260/011* (2013.01)

(58) Field of Classification Search
CPC ...... F17C 2203/0619; F17C 2203/0673; F17C 2205/0305; F17C 2209/2154; F17C 2221/012; F17C 2221/033; F17C 2223/0123; F17C 2260/011
See application file for complete search history.

(56) References Cited

FOREIGN PATENT DOCUMENTS

| | | |
|---|---|---|
| CN | 101440909 A | 5/2009 |
| EP | 3 225 900 A1 | 10/2017 |
| EP | 3 267 091 A1 | 1/2018 |
| FR | 2 948 167 A1 | 1/2011 |
| JP | 8-219390 | 8/1996 |
| JP | 9-112796 A | 5/1997 |
| JP | 2001-21099 | 1/2001 |
| JP | 2008-169893 | 7/2008 |

OTHER PUBLICATIONS

Office Action dated Mar. 10, 2022, in Japanese Patent Application No. 2019-572086, filed Jul. 3, 2018 w/English translation.

\* cited by examiner

Fig. 7A ical section.
PRESSURE VESSEL

FIELD OF INVENTION

The field of the invention relates to pressure vessels, in particular pressure vessels for use in a vehicle. Particular embodiments relate to pressure vessels for storing hydrogen gas, liquid petroleum gas (LPG), compressed natural gas (CNG), or ammonia.

BACKGROUND

Today a pressure vessel for high pressure storage is typically made out of a liner on which a composite reinforcement structure is manufactured by using a filament winding process. For example, for a type IV pressure vessel, the process for making the pressure vessel may comprise:
- manufacturing of a thermoplastic liner e.g. by injection moulding or blow-moulding, roto-moulding, or a combination of a tube extrusion with any type of moulding process, wherein the moulded end sections are typically welded to the tube extrusion; the manufacturing time for this step is typically between 1 and 5 minutes;
- applying a filament winding, e.g. by applying reinforcement fibres with in-line impregnation; the time required for this step is typically 2-4 hours for a 60 litre vessel;
- curing; this step typically requires 4-6 hours for a 60 litre vessel.

U.S. Pat. No. 3,112,234 describes annular reinforcement patches wound between the layers of the winding. This allows making an opening through the pressure vessel in another location than at the pole openings. The design of this opening is based on multiple annular reinforcing patches which are integrated in between layers and through which the hole is cut after the vessel manufacturing.

U.S. Pat. No. 3,815,773 describes a pressure vessel with a metal liner and an integrated load distribution layer between the metal liner and a resin-impregnated fibre housing. In that manner fatigue problems during pressure cycling of a type III pressure vessel can be avoided.

US 2004/0173618 discloses a pressure container with a boss with a flange. The flange extends toward the periphery of the container body at the bonding part thereof at which it bonds to the container body. The liner of the pressure container has a self-sealing part at which it abuts the flange to be sealed up together. On the outer peripheral side of the self-sealing part, a ring-shaped constraint member is provided in the outer periphery of the liner, and the constraint member is to restrict the diameter expansion of the liner to be caused by the expansion of the container body. The liner has an easily-displaceable part that is readily extendable and deformable, at the outer periphery thereof in the radial direction of the self-sealing part.

SUMMARY

Embodiments of the invention aim to provide a pressure vessel capable of withstanding high stress loads and having a reduced weight compared to prior art vessels capable of withstanding the same stress loads.

According to a first aspect of the invention, there is provided a pressure vessel configured to store a fluid under pressure. The pressure vessel comprises a thermoplastic liner, a boss, a reinforcement structure and a local reinforcement layer. The thermoplastic liner has a cylindrical section, a first rounded end section and a second rounded end section. The first rounded end section has an opening. The flange of the boss is arranged around said opening. The reinforcement structure is made of a composite material, and the reinforcement structure surrounds at least the cylindrical section of the thermoplastic liner. The local reinforcement layer is either embedded in said reinforcement structure, or positioned between the reinforcement structure and the liner, or integrated in the liner. The local reinforcement layer surrounds at least a portion of the first rounded end section in an area between the boss and the cylindrical section of the thermoplastic liner, and surrounds less than 20% of the cylindrical section.

It is noted that in US 2004/0173618 the constraint member does not surround a rounded end section of the liner. Rather, it surrounds a cylindrical stepped end section of the liner.

The expression "rounded end section" implies that the end section is rounded in an axial direction of the liner. As explained below, preferably the end section is substantially dome-shaped.

The expression "less than 20%" implies that in certain embodiments the local reinforcement layer does not surround the cylindrical section, and in other embodiments the local reinforcement layer extends over a small distance (smaller than 20% of the length of the cylindrical section) over the cylindrical section.

The expression "integrated in the liner" implies that the local reinforcement layer may be adhered to a surface of the liner, e.g. by welding or may be formed together with the liner, e.g. by overmoulding, but such that a local reinforcement layer is created with material properties which are different from the material properties of the liner to create a local reinforcement of the liner. In a preferred embodiment, the local reinforcement layer is formed by one or more tape sections welded to the liner.

The expression "positioned between the reinforcement structure and the liner" implies that the local reinforcement layer does not need to be attached to the liner but may be held in place by the reinforcement structure.

The expression "embedded in the reinforcement structure" means that composite material of the reinforcement structure extends below and above the local reinforcement layer.

The inventors have discovered that in prior art pressure vessels the reinforcement structure is not used up to its full load capacity when the reinforcement structure is put at the maximum pressure of the pressure vessel (typically during a burst test), i.e. typically the fibres of the reinforcement structure are not used up to their full load capacity when they are put at the maximum pressure. This means that the stresses in the reinforcement structure are high in some locations but remain low in other locations of the pressure vessel. The location of the maximum stress is typically in the rounded end sections of the pressure vessel or in a transition area between the cylindrical section and a rounded end section of the pressure vessel. These areas are typically reinforced by adding helical layers and/or optimizing the angles of existing helical layers of the reinforcement structure. Embodiments of the invention are inter alia based on the insight of the inventors that layers which are added to reduce the stresses in the rounded end sections of the pressure vessel or in the transition area between the cylindrical section and the rounded end sections are not efficiently used in a substantial part of the cylindrical section of the pressure vessel. The additional layers are contributing only locally and thus adding weight and manufacturing time to the pressure vessel. Another problem when producing a pressure vessel is the duration of the curing cycle after the forming of the reinforcement structure. This duration is dependant of the final composite thickness of the reinforcement structure: the thicker the reinforcement structure, the longer the curing duration. These inventive insights are addressed by embodiments of the pressure vessel of the invention. Indeed, by adding a local reinforcement layer in a manner described above, the reinforcement structure can be thinner resulting in a weight reduction of the pressure vessel compared to prior art pressure vessels with the same mechanical strength. The local reinforcement layer surrounds at least a portion of the first rounded end section and surrounds less than 20% of the cylindrical section, and at least a portion of the local reinforcement layer is arranged in an area of the pressure vessel between the boss and the cylindrical section of the thermoplastic liner. In that manner the local reinforcement layer can be provided in the critical areas where the stresses are highest.

Preferably, the reinforcement structure covers at least partially the local reinforcement layer. More preferably the reinforcement structure fully covers the local reinforcement layer. In that manner the local reinforcement layer may be held firmly in place by the reinforcement structure.

According to an exemplary embodiment the local reinforcement layer is made of any one of the following materials: metal, composite material. Preferably, the composite material comprises reinforcement fibres embedded in a thermoset or thermoplastic matrix. More preferably, the local reinforcement layer is formed by a thermoplastic or thermoset pre-preg or by a reinforcement tape. Such a composite material has the advantage that it can be easily arranged in the pressure vessel, and is sufficiently strong whilst being at the same time sufficiently light-weight.

In the context of the present application the term "pre-preg" refers to a sheet comprising both a thermoplastic or thermoset material and chopped fibres or long fibres or continuous fibres which may or may not be woven. In general, the chopped fibres have final lengths of a few tens/hundreds of microns. In the case of the long fibres, the residual lengths may be a few millimetres. If the length of the fibres used is several tens of centimetres then these are referred to as continuous fibres or continuous filaments. These fibres may be based on glass (type E, S or other), on carbon, on a polymer (such as a polyamide, for example an aromatic polyamide such as aramid, or polyethylene) or may even be natural fibres such as hemp or sisal. They are preferably carbon fibres. The fibres of the pre-preg are preferably compatible with the thermoplastics material or thermoset material of the pre-preg. In order to obtain this compatibility, the fibres may be sized (surface treated) with a compatibility substance such as a silane. A binder of reactive HDPE type may also be used. In this context, reactive functions of maleic anhydride type may advantageously be used. The fibre content in the pre-preg is preferably at most 70%, the rest of the reinforcement essentially consisting of thermoplastic or thermoset material. In other words, the thermoplastic or thermoset material content of the pre-preg is at least 30%. In practice, the pre-preg may be produced by calendering, compression moulding, injection moulding, spray moulding or even moulding under.

In the context of the present invention, the term "reinforcement tape" refers to a tape which comprises any kind of reinforcing fibres in a thermoplastic or thermoset resin. The reinforcing fibres can be made from for example, carbon, glass, basalt, aramid, polyethylene, or any other reinforcement fibre. The reinforcing fibres add strength and stiffness to a part along the direction of the fibre length. The fibres are preferably continuous or near continuous in length and are preferably aligned substantially parallel with the tape length (or longitudinal axis of the tape); but no specific reinforcement format within the tape is required for the invention to be practiced. The thermoplastic resin can be e.g. a polyamide, a polyolefin, or a polyphenylene sulphide. The thermoset resin may be an epoxy or unsaturated polyester or polyurethane. As with most polymer composite applications, the specific resin and fibres used and their proportion and format within the composite are determined by the specific requirements of the local reinforcement layer to be manufactured. The thermoplastic tapes may be arranged onto the liner e.g. by laser, hot gas, IR, ultrasound, electronic projection or any others methods known by the person skilled in the art. The thermoplastic material may be bonded in situ as it is arranged on the liner by the application of heat and pressure. The tape can be almost any shape, for example band shape, wave shape. Preferably, the tape is a band shape.

According to an exemplary embodiment the material of the local reinforcement layer is different form the material of the liner. According to an exemplary embodiment the material of the local reinforcement layer is a composite material different form the material of the reinforcement structure. More in particular the material of the reinforcement layer may be chosen to be optimal for being capable of withstanding the required stress loads.

According to an exemplary embodiment the local reinforcement layer has a Young modulus, measured for a test specimen of for instance 40×10×1 mm, which is larger than 30 GPa, more preferably larger than 40 GPa, even more preferably larger than 50 GPa. If the local reinforcement layer comprises fibres, the measurement is performed in the direction of the fibres. If the local reinforcement layer comprises fibres in different directions, then the requirement is preferably fulfilled for at least one direction. Materials having such a Young modulus are available, e.g. in form of pre-pregs or reinforced tapes, and provide a sufficient local strength.

According to a preferred embodiment, the local reinforcement layer has a substantially constant thickness, preferably a thickness which is within 20% of a nominal value, more preferably within 10% of a nominal value.

According to an exemplary embodiment the local reinforcement layer has a thickness which is larger than 1 mm. According to an exemplary embodiment the local reinforcement layer has a thickness which is smaller than 6 mm, more preferably smaller than 5 mm. The inventors have found that layers fulfilling those thickness requirements are adequate for being able to withstand the typical local stresses in pressure vessels in the rounded end sections and/or in a transition area between a rounded end section and the cylindrical section of the pressure vessel.

According to an exemplary embodiment the maximum outer diameter (Dmax) of the circumferential part formed by the local reinforcement layer is larger than 50% of the outer diameter (D) of the cylindrical section of the liner, preferably larger than 70%, more preferably larger than 80%, even more preferably larger than 90%. In that manner, the critical area in the first rounded end section will be strengthened by the local reinforcement layer.

According to an exemplary embodiment, seen in an axial direction of the pressure vessel, the first rounded end section has a length L2, and the local reinforcement layer surrounds the first rounded end section at least in a portion of a first zone (Z1) of the first rounded end section, said first zone (Z1) extending from the cylindrical section over a length L2/2 in the axial direction of the pressure vessel. In that manner, the critical area of the first rounded end section near the cylindrical portion of the liner will be strengthened by the local reinforcement layer. More preferably, the first zone (Z1) extends from the cylindrical section over a length (¾)*L2 in the axial direction of the pressure vessel, and e.g. over the entire length L2. As explained below, the local reinforcement layer may even extend over the boss.

According to an exemplary embodiment the local reinforcement layer is arranged between the liner and the reinforcement structure. In that manner the local reinforcement layer is not in contact with the fluid in the pressure vessel and is held in place by the reinforcement structure, resulting in a broad range of materials that can be used for the local reinforcement layer.

According to an exemplary embodiment the reinforcement structure comprises reinforcement fibres, e.g. carbon, glass, aramid, etc., embedded in a thermoset or thermoplastic matrix. According to an exemplary embodiment the reinforcement structure comprises one or more of the following: a filament winding layer, a braided layer, a tape layer. The reinforcement structure may be obtained by a filament winding process, a braiding process, an automatic tape placement process, a laser assisted tape placement process, a combination thereof, or any alternative process.

Preferably the boss is made of metal, more preferably of aluminium. Preferably the boss has a passage delimited by a cylindrical inner surface of the boss. Typically, the passage extends in the axial direction of the pressure vessel and is typically aligned with the opening in the liner. The flange of the boss protrudes outwardly from the passage. The shape of the flange of the boss may be adapted to the shape of the first rounded end section around the opening therein. The boss is a component to which a functional component may be attached. To that end the boss may be provided with an internal screw thread for cooperating with a screw thread on the functional component. The function component may be e.g. a valve, such as a pressure relief valve or a multifunctional valve, an outlet, a sensor, a thermal pressure relief valve, a pressure sensor, a temperature sensor, an overpressure relief valve, an adaptor part, a fitting part, a closure part, etc.

According to an exemplary embodiment a circumferential edge of the opening of the first rounded end section is connected to a cylindrical end section protruding outwardly of the liner, wherein the boss is arranged around the cylindrical end section, and wherein the local reinforcement layer and/or the reinforcement structure extends over the boss. In that manner the local reinforcement layer and/or the reinforcement structure will hold the boss in place, resulting in a compact and strong end section of the pressure vessel.

According to another exemplary embodiment a circumferential edge of the opening of the first rounded end section is connected to a cylindrical end section protruding inwardly of the liner, wherein the boss is arranged in the cylindrical end section, and protrudes out of the liner, and wherein the local reinforcement layer and/or the reinforcement structure extends over a portion of the boss. Also in this embodiment the local reinforcement layer and/or the reinforcement structure will hold the boss in place, resulting in a compact and strong end section of the pressure vessel.

According to an exemplary embodiment the first and/or the second rounded end section of the liner is substantially dome shaped. This is usually the optimal shape for dealing with high pressure loads in the pressure vessel. It is noted that the end section of the liner may further comprise a more or less flat end portion containing the opening or a cylindrical portion containing the opening, but the reinforcement layer surrounds the substantially dome shape section which is free of steps or discontinuities.

According to an exemplary embodiment the pressure vessel is configured to store any one of the following: liquid petroleum gas (LPG), hydrogen, compressed natural gas (CNG), ammonia; and the pressure vessel is configured to withstand a pressure above 2 bar.

According to another aspect of the invention there is provided a method for manufacturing a pressure vessel configured for storing a fluid under pressure, said method comprising:
  forming a thermoplastic liner having a cylindrical section, a first rounded end section and a second rounded end section, wherein an opening is provided in the first rounded end section;
  arranging a boss around the opening in the first rounded end section;
  forming a reinforcement structure made of a composite material such that said reinforcement structure surrounds at least the cylindrical section of the thermoplastic liner; and
  either embedding a local reinforcement layer in said reinforcement structure, or positioning a local reinforcement layer between the liner and the reinforcement structure, or integrating a local reinforcement layer in said liner, such that said local reinforcement layer surrounds at least a portion of the first rounded end section in an area between the boss and the cylindrical section of the thermoplastic liner, and surrounds less than 20% of the cylindrical section.

According to an exemplary embodiment the local reinforcement layer is over-moulded on the liner during moulding of the liner or of sub-portions of the liner. The forming of the liner may be done by e.g. blow moulding, injection moulding, roto-moulding, or a combination of a tube extrusion with any type of moulding process, wherein the moulded end sections are typically welded to the tube extrusion. For example, a pre-preg, e.g. a carbon based pre-preg could be heated outside the mould, draped to the correct shape and positioned inside the mould to be over-moulded during the liner manufacturing process.

According to an exemplary embodiment the local reinforcement layer is positioned on the liner in between the forming of the liner and the forming of the reinforcement structure; wherein the reinforcement layer is either integrated as a stand-alone component, or adhered to the liner after the forming of the liner. For example, a local reinforcement layer may be positioned on the liner in between the process steps of liner manufacturing and reinforcement structure manufacturing. In this embodiment the local reinforcement layer may be integrated as a stand-alone component. Alternatively the local reinforcement layer may be adhered, e.g. welded, to the liner after the manufacturing process of the liner. In a particular embodiment a thermoplastic reinforcement tape may be laser welded directly on the first rounded end section in order to create the local reinforcement layer.

According to an exemplary embodiment the local reinforcement layer is embedded in the reinforcement structure by positioning of the local reinforcement layer between two composite layers of the reinforcement structure. The local reinforcement layer may be embedded in the reinforcement structure, e.g. by positioning of the local reinforcement layer between two filament layers of the reinforcement structure. In that manner the local reinforcement layer may be firmly held in place between two composite layers of the composite structure.

According to an exemplary embodiment a portion of the local reinforcement layer is arranged on the liner or embedded in a portion of the reinforcement structure, and wherein a thermoset or thermoplastic resin is injected to form the local reinforcement layer and the reinforcement structure. By arranging of a "dry" portion of the local reinforcement layer on the liner or embedding of a "dry" portion of the local reinforcement layer in a "dry" portion of the reinforcement structure, the injecting of a thermoset or thermoplastic resin to form the local reinforcement layer and the reinforcement structure can be done in one step. For example, a filament winding may be performed without in-line impregnation of the reinforcement fibre. In that embodiment a "dry" local reinforcement layer portion could be positioned on the liner and/or in between different layers of the filament winding. The filament winding step is followed by an injection of a thermoset or thermoplastic resin to consolidate the composite material of the reinforcement structure and the local reinforcement layer.

According to an exemplary embodiment the liner may be made of a mono-material based on e.g. HDPE, PA, PPA, PVDF, or any other suitable thermoplastic material. Alternatively, the liner may be made out of a coextruded structure, e.g. a coextruded layer including a layer with very low hydrogen permeability (typically EVOH).

According to an exemplary embodiment the reinforcement structure is formed at least partially over the local reinforcement layer, preferably fully over the local reinforcement layer.

According to an exemplary embodiment the position of the local reinforcement layer is chosen such that the maximum outer diameter (Dmax) of the circumferential part formed by the local reinforcement layer is larger than 50% of the outer diameter (D) of the cylindrical section of the liner, preferably larger than 70%, more preferably larger than 80%.

According to an exemplary embodiment the local reinforcement layer is chosen such that it has a thickness which is larger than 1 mm and/or which is smaller than 6 mm, more preferably smaller than 5 mm.

According to an exemplary embodiment wherein the reinforcement structure is made by one or more of the following: filament winding, braiding, applying a reinforcement tape.

According to an exemplary embodiment the local reinforcement layer and/or the reinforcement structure are formed such that the local reinforcement layer and/or the reinforcement structure extends over the boss.

According to an exemplary embodiment the liner is formed such that a circumferential edge of the opening of the first rounded end section is provided with a cylindrical end section protruding outwardly of the liner, wherein the boss is arranged around the cylindrical end section. According to another embodiment, the liner is formed such that a circumferential edge of the opening of the first rounded end section is provided with a cylindrical end section protruding inwardly of the liner, wherein the boss is arranged in the cylindrical end section, and wherein the flange of the boss protrudes out of the liner, around the opening.

According to an exemplary embodiment, the first and the second rounded end section may be provided with a first and second local reinforcement layer, respectively. The first local reinforcement layer may be either embedded in the reinforcement structure, or arranged on the liner, or integrated in the liner, wherein the first local reinforcement layer surrounds at least a portion of the first rounded end section and surrounds less than 20% of the cylindrical section. Similarly, the second local reinforcement layer may be either embedded in the reinforcement structure, or arranged on the liner, or integrated in the liner, wherein the second local reinforcement layer surrounds at least a portion of the second rounded end section and surrounds less than 20% of the cylindrical section. In typical embodiments, both the first and the second rounded end section may benefit from a local reinforcement, and this is achieved with this embodiment.

According to an exemplary embodiment, there may be provided more than one local reinforcement layer, e.g. a local reinforcement layer on the liner or integrated in the liner and a further local reinforcement layer embedded in the reinforcement structure; wherein both the local reinforcement layer and the further local reinforcement layer may surround at least a portion of the same rounded end section and surround less than 20% of the cylindrical section. Such an embodiment may further increase the mechanical strength in local areas as required. According to another exemplary embodiment, a second local reinforcement layer may be provided adjacent the local reinforcement layer, seen in an axial direction of the pressure vessel, wherein said second reinforcement layer is different from said local reinforcement layer. In other words, there may be provided a plurality of adjacent local reinforcement layers seen in the axial direction of the pressure vessel. The adjacent local reinforcement layers may have different properties which may be optimized in function of the position on the pressure vessel. The adjacent local reinforcement layers may be applied e.g. as pre-pregs or as reinforcement tapes.

In the context of the present invention, the term "pressure vessel" refers to a vessel that is capable of withstanding an internal pressure of at least 2 bar, preferably at least 3 bar. The pressure vessel may comprise components integrated in the body of the pressure vessel body such as functional parts mounted in an opening of the pressure vessel body. Examples thereof are described in more detail in the figure description below. The pressure vessel body may have an elongated substantially cylindrical section with two rounded end sections and the functional part may be arranged in one of these rounded end section.

In the context of the present invention, the term "pressure vessel of type IV" refers to a construction featuring a liner on which a carbon fibre or hybrid carbon/glass fibre composite is arranged. The liner remains a part of the vessel after manufacturing.

In the context of the present invention, the term "thermoplastic material" denotes any thermoplastic polymer including thermoplastic elastomers, as well as blends thereof. The term "polymer" denotes both homopolymers and copolymers (especially binary or ternary copolymers). Examples of such copolymers are, but not limited to, random copolymers, linear block copolymers, other block copolymers and graft copolymers. One polymer which is often used is polyethylene. Excellent results have been obtained with high density polyethylene (HDPE) and fibre reinforced polymer.

According to an exemplary embodiment the first and/or the second rounded end section of the liner are formed such that they are substantially dome shaped. It is noted that the end section may have a more or less flat end portion containing the opening, but the reinforcement layer preferably surrounds the substantially dome shape section which is free of steps or discontinuities.

Preferred features described above for the pressure vessel also apply for the method and vice versa.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
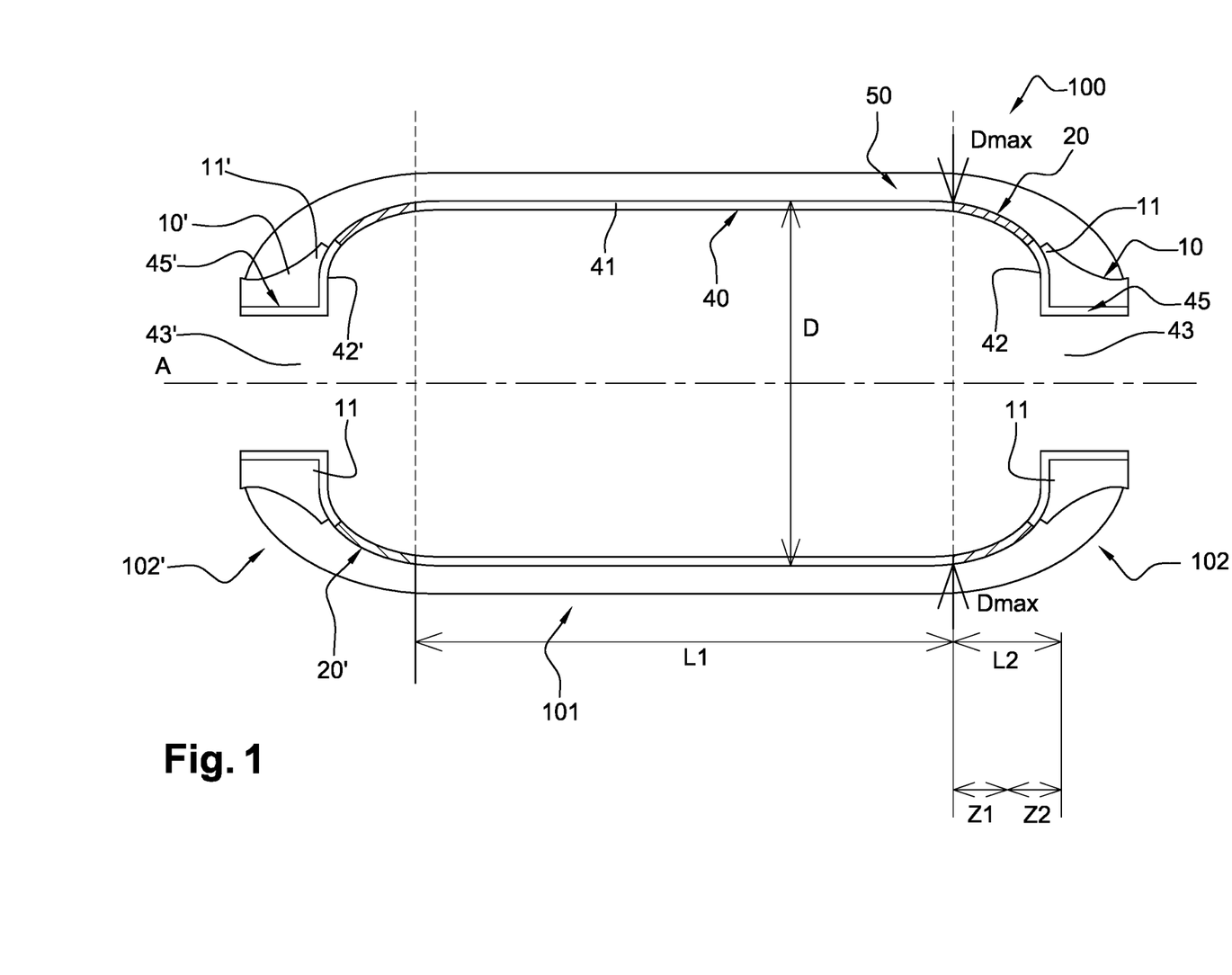
FIG. 1 illustrates schematically a partial cross section through a first exemplary embodiment of a pressure vessel according to the present invention.

FIG. 1 illustrates a first exemplary embodiment of pressure vessel 100 configured to store gas under pressure. The pressure vessel 100 of FIG. 1 comprises a thermoplastic liner 40, a reinforcement structure 50, a first and second local reinforcement layer 20, 20', and bosses 10, 10'. The thermoplastic liner 40 has an elongated cylindrical section 41, a first rounded end section 42 and a second rounded end section 42'. The reinforcement structure 50 is made of a composite material and surrounds at least the cylindrical section 41 of the thermoplastic liner 40. Preferably, the reinforcement structure 50 surrounds the liner 41 both in the cylindrical section 41 and in the first and second rounded end sections 42, 42', as drawn in FIG. 1. More preferably the reinforcement structure 50 also extends over the bosses 10, 10'. The local reinforcement layer 20, 20' is arranged either directly on the thermoplastic liner 40, at least partially below said reinforcement structure 50, preferably fully covered by said reinforcement structure 50 (as drawn in FIG. 1); or embedded in said reinforcement structure 50 (as drawn in FIG. 2C, see further).

The first local reinforcement layer 20 surrounds the first rounded end section 42, preferably over at least 20% of the length L2 thereof, seen in axial direction A of the pressure vessel 100, more preferably over at least 50% of the length L2, even more preferably over at least 70% of the length L2. Preferably, the first local reinforcement layer 20 does not surround the cylindrical section 41, or extends over only a minor part of the cylindrical section 41, preferably less than 20% of the diameter of the cylindrical section 41, more preferably less than 15% of the diameter of the cylindrical section 41. The local reinforcement layer 20 surrounds the first rounded end section 42 at least in a portion of a first zone (Z1) of the first rounded section 42, said first zone (Z1) extending from the cylindrical section over a length L2/2 in the axial direction of the pressure vessel. The local reinforcement layer 20 may be present in a portion of the first zone Z1 or in the entire first zone Z1. The local reinforcement layer 20 may also extend over the second zone Z2 covering the last half of the first rounded end section 42, and/or may extend over the cylindrical section 41 and/or may extend over the boss 10, see further. Preferably, the maximum outer diameter Dmax of the circumferential part formed by the local reinforcement layer 20 is larger than 50% of the outer diameter D of the cylindrical section 41 of the liner 40, preferably larger than 70%, more preferably larger than 80%, even more preferably larger than 90%. In that manner, the critical area in the first rounded end section 42 will be strengthened by the local reinforcement layer 20.

In the system shown in FIG. 1, the liner 40, the reinforcement structure 50 and the first and second local reinforcement layers 20, 20' form a pressure vessel 100 with an elongated cylindrical section 101 and a first and second rounded end section 102, 102'.

Preferably, the first and second local reinforcement layer 20, 20' is made of any one of the following materials: metal, composite material. In a preferred embodiment the first and second local reinforcement layer 20, 20' are made of a composite material which is applied in the form of a thermoplastic or thermoset pre-preg. A pre-preg comprises "pre-impregnated" fibres, wherein fibres are pre-impregnated in a thermoset of thermoplastic polymer matrix material. The fibres may take the form of a weave and the matrix is used to bond them together and to allow bonding to the liner or to other components. If a thermoset matrix is used, typically, the thermoset matrix is only partially cured before arranging it in the pressure vessel to allow easy handling; it is allowed to fully cure after integration in the pressure vessel.

According to an exemplary embodiment the local reinforcement layer 20, 20' has a Young modulus, measured for a test specimen of for instance 40×10×1 mm, which is larger than 30 GPa, more preferably larger than 40 GPa, even more preferably larger than 50 GPa. If the local reinforcement layer 20, 20' comprises fibres, the measurement is performed in the direction of the fibres. If the local reinforcement layer comprises fibres in different directions, then the requirement is preferably fulfilled for at least one direction.

Preferably, the local reinforcement layer 20, 20' has a thickness which is larger than 1 mm. More preferably, the thickness if between 1 mm and 5 mm, even more preferably between 1 mm and 4 mm.

The reinforcement structure 50 may be made from a composite material and may comprise reinforcement fibres, e.g. carbon, glass, aramid, etc., embedded in a thermoset or thermoplastic matrix. The reinforcement structure 50 may be obtained by a filament winding process, a braiding process, an automatic tape placement process, a laser assisted tape placement process, a combination thereof, or any alternative process. The reinforcement structure 50 may comprise one or more of the following: a filament winding layer, a braided layer, a tape layer. Preferably, the reinforcement structure comprises a filament winding layer. Advantageous reinforcement structures are described in European patent application EP 16 305 374.7 and in EP16305839.9 in the name of the applicant, which patent documents are included herein by reference.

Preferably, the first and second rounded end section 42, 42' is substantially dome shaped. It is noted that those end sections are typically provided with an opening 43, 43'. The edge delimiting the opening 43, 43' is connected to a cylindrical end section 45, 45' protruding outwardly of the liner 40, wherein a boss 10, 10' is arranged around the cylindrical end section 45, 45'. The boss 10, 10' has a flange 11, 11' which is arranged against the rounded end section 42, 42' in an area around the opening 43, 43'. Preferably, the reinforcement structure 50 extends over the boss 10, 10'. Optionally also the local reinforcement layer 20, 20' may extend over the boss 10, 10' (not drawn in FIG. 1). As the liner 40 is often not made of a material strong enough to hold the functional part within the opening 43, the pressure vessel 100 is typically provided with the boss 10, 10' around the cylindrical end section 45, 45'. This boss 10 may be formed from metal or any other material resisting to the pressure in the pressure vessel 100. The boss 10, 10' is typically made out of aluminium. The reinforcement structure 50 may be arranged around the boss 10. In other words, during manufacturing first the boss 10 may be arranged around the cylindrical end section 45 of liner 40, whereupon reinforcing material for forming the reinforcement structure 50 may be arranged over the liner 40 and over a circumferential outer surface of the boss 10. Similarly the local reinforcement layer 20 may be arranged so that it extends partly over a circumferential outer surface of the boss 10.

The pressure vessel of FIG. 1 may have a volume between 20 and 120 litres. It may be a so-called type IV vessel, see the definition given above. Preferably, the pressure vessel is configured to store any one of the following: liquid petroleum gas (LPG), hydrogen, compressed natural gas (CNG), ammonia. Preferably, the pressure vessel is configured to withstand a pressure above 2 bar. The pressure vessel may be configured to store a gas at a pressure above 0.3 MPa (3 bar) in some embodiments of the invention. If the pressure vessel is configured to store liquid petroleum gas (LPG), then the pressure vessel may be configured to store this liquid petroleum gas at a pressure of approximately 0.5 MPa to 1.5 MPa (5 to 15 bar). For pressure vessels configured to store hydrogen gas, the pressure vessel may store this gas at a pressure of approximately 70 MPa (700 bar), or 35 MPa (old standard 350 bar). If the pressure vessel is for storing compressed natural gas (CNG), the pressure vessel may be configured to store the gas at approximately 20 MPa (200 bar). If the pressure vessel is for storing ammonia, typically aqua ammonia, the pressure vessel may be configured to store the ammonia at a pressure from 0.1 MPa to 2 MPa.

The liner 40 may be manufactured from a thermoplastic material by blow moulding or injection moulding, or any other suitable moulding technique. The liner 40 may also be formed from an extruded tube section and two moulded dome-shaped sections which are welded to the tube section. The liner 40 can be composed of a mono-material based on HDPE, PA, PPA, PVDF, etc., or can be made out of a coextruded structure including a layer with very low hydrogen permeability, such as an EVOH layer.

The reinforcement structure 50 may comprise helical windings, and in embodiments of the invention some of the helical windings may be removed compared to prior art embodiments with the same mechanical strength requirements, whilst adding the local reinforcement layer 20, 20' on the rounded end sections 42, 42' or on a transition area between the cylindrical section 41 and the rounded end sections 42, 42'. Embodiments of the invention will result in a lower weight pressure vessel for the same mechanical strength requirements. This will also reduce the manufacturing time, especially the time needed for curing.

This local reinforcement layer 20, 20' can be obtained by the following exemplary methods:
over-moulding of a local reinforcement layer during the moulding process of the liner or of sub portions of the liner. In an exemplary embodiment, a pre-preg, e.g. carbon based pre-preg could be heated outside the mould, draped to the correct shape and positioned inside the mould to be over-moulded during the liner manufacturing process; in another exemplary embodiment a build-up of reinforcement tape sections may be positioned inside the mould to be over-moulded during the liner manufacturing.

positioning a local reinforcement layer on the liner in between the process steps of liner manufacturing and reinforcement structure manufacturing. In this embodiment the local reinforcement layer may be integrated as a stand-alone component;

adhering, e.g. welding of the local reinforcement layer to the liner after the manufacturing process of the liner. In a particular embodiment a thermoplastic tape may be laser welded directly on the rounded end sections in order to create the local reinforcement layer; also, plurality of tape sections may be laser welded to form one or more local reinforcement layers, wherein the different tape sections may have the same of different strength properties;

embedding the local reinforcement layer in the reinforcement structure, e.g. by positioning of the local reinforcement layer between two composite layers of the reinforcement structure;

arranging of a "dry" portion of the local reinforcement layer on the liner or embedding of a "dry" portion of the local reinforcement layer in a "dry" portion of the reinforcement structure, and injecting of a thermoset or thermoplastic resin to form the local reinforcement layer and the reinforcement structure. For example, a filament winding may be performed without in-line impregnation of the reinforcement fibre. In that embodiment a "dry" local reinforcement layer portion could be positioned on the liner and/or in between different layers of the filament winding. The filament winding step is followed by an injection of a thermoset or thermoplastic resin to consolidate the composite material of the reinforcement structure and the local reinforcement layer. The local reinforcement can also be manufactured by a build-up of tape sections on a manufacturing support. Once this build-up is finished it can be positioned integrated in or arranged on the liner by any mould process.

FIGS. 2A-2D illustrate four possible exemplary embodiments of a pressure vessel comprising a liner 40, a reinforcement structure 50 and a local reinforcement layer 20. A boss 10 is provided, as described above for the embodiment of FIG. 1.

Figure 2A:
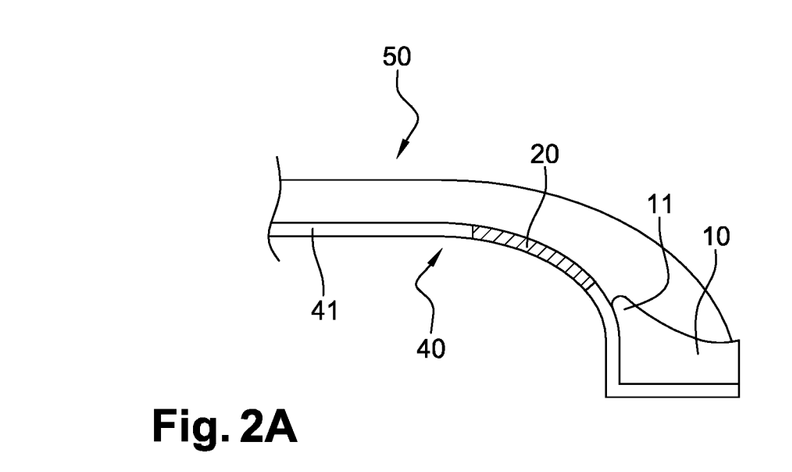
FIGS. 2A-2D illustrate schematically cross sections of a portion of a pressure vessel, in accordance with different embodiments of a pressure vessel according to the present invention.
Figure 2B:
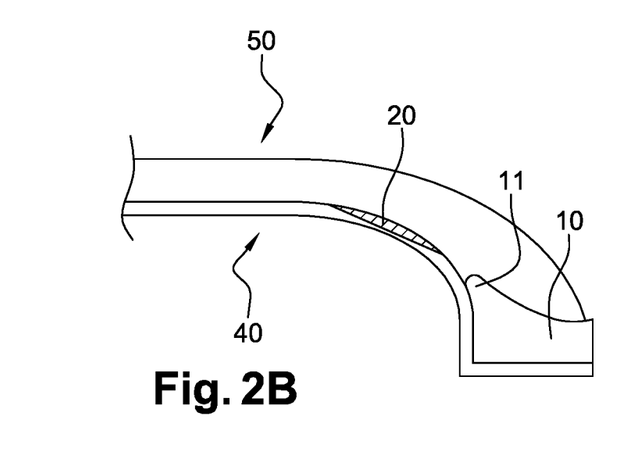

In the embodiment of FIG. 2A the local reinforcement layer 20 is integrated in the liner 40 and may extends over a portion of the thickness of the liner 40 or over the entire thickness of the liner 40. Preferably the local reinforcement layer is integrated at an outer surface of the liner 40. In the embodiment of FIG. 2B the local reinforcement layer 20 is positioned at an outer surface of the liner 40 and does not extend over the entire thickness of the liner 40. This embodiment may have the advantage that the local reinforcement 20 is not in contact with the gas in the pressure vessel which could be advantageous in terms of preventing any contamination.

Figure 2C:
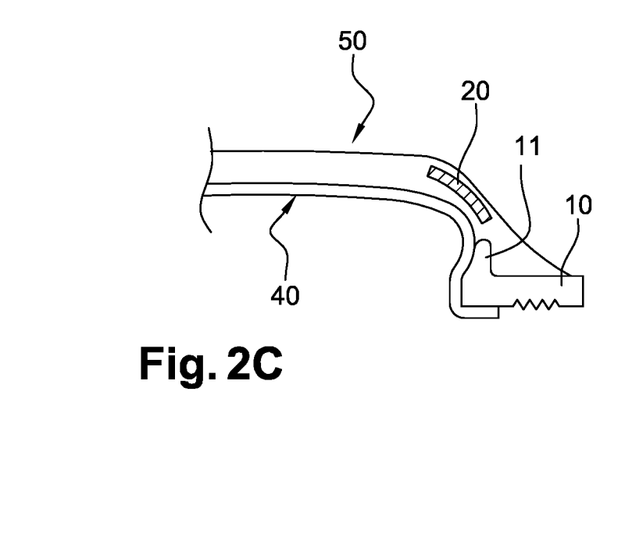
Figure 2D:
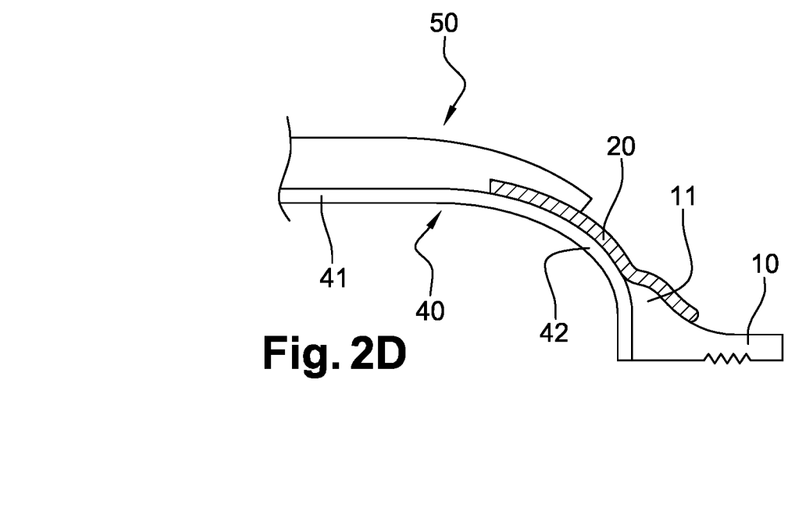

In the embodiment of FIG. 2C the local reinforcement layer 20 is embedded in the reinforcement structure 50. Optionally (not drawn), the local reinforcement layer 20 may extend over the boss 10. In some embodiments the boss 10 may comprise a screw thread, see FIG. 2C, for fixing a functional component in the boss. FIG. 2D illustrates another more detailed implementation of a possible pressure vessel. In this embodiment the reinforcement structure 50 is arranged on the cylindrical section 41 of the liner 40 and extends partially over the local reinforcement layer 20. The local reinforcement layer 20 is a pre-preg or a reinforcement tape arranged on the rounded end section 42 of the liner 40. The local reinforcement layer 20 extends over the boss 10. Some of the features described above in connection with FIGS. 1 and 2A-2D are also present in the exemplary embodiments of FIGS. 3-6, and will not be described again.

In the embodiment of the pressure vessel 100 shown in FIG. 1, an outwardly protruding substantially cylindrical end section 45 is provided. In embodiments where the substantially cylindrical end section 45 protrudes outwardly, the boss 10 may be arranged around the substantially cylindrical end section 45. In contrast, in FIG. 3, the liner 40 is provided with an inwardly protruding cylindrical end section 46 (i.e. a substantially cylindrical section 46 protruding inwardly towards the interior of the pressure vessel 100). A boss 10 may be inserted in the inwardly protruding end section 46. The boss 10 is intended for mounting components, such as a valve, e.g. a pressure relief valve or a multifunctional valve, an outlet, a sensor, a thermal pressure relief valve, a pressure sensor, a temperature sensor, an over-pressure relief valve, an adaptor part, a fitting part, etc. It is noted that, in an alternative embodiment, boss 10 may also be a closed part, i.e. a part not having a central passage. In the pressure vessel 100 shown in FIG. 3, the boss 10 comprises a first substantially cylindrical portion 12 having a first diameter, and a second substantially cylindrical portion forming the flange 11 having a second diameter for example larger than the first diameter, said first portion 12 being inserted in the opening 43 and the flange 11 extending outwardly out of the opening 43. A seal 3 may be arranged within the opening 43, between the cylindrical end section 46 and the boss 10, in order to prevent the stored gas from escaping from the pressure vessel 100. The local reinforcement layer 20 and/or the reinforcement structure 50 may extend over and surround the first substantially cylindrical portion 12 and/or the flange 11.

Figure 4:
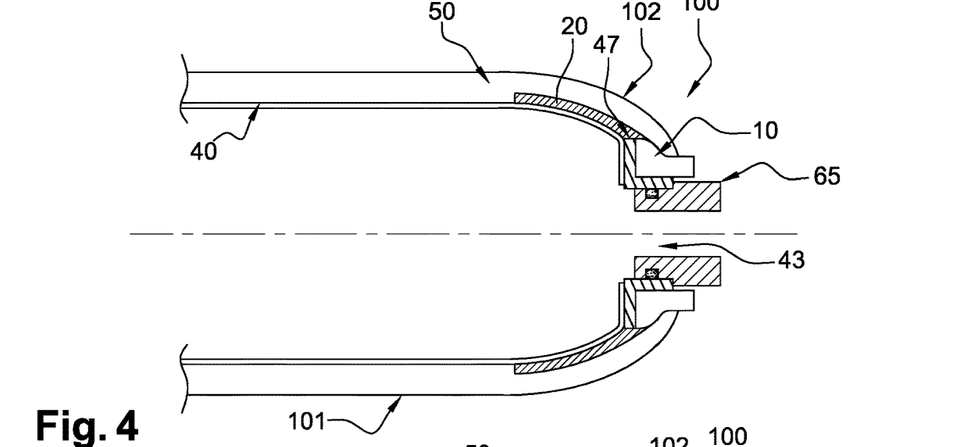

In the exemplary embodiment of FIG. 4, the liner 40 is not provided with a cylindrical end section. Instead, a cylindrical section is formed by a separate cylindrical component 47 which may be over-moulded on the boss 10. This cylindrical component 47 may be formed from a weldable thermoplastic material. During the manufacturing of the embodiment of FIG. 4, the cylindrical component 47 may be welded first to the liner 40, and then the local reinforcement layer 20 and the reinforcement structure 50 may be applied. The local reinforcement layer 20 may also be arranged before the cylindrical component 47. Further a functional component 65, here drawn in the form of an adaptor part is inserted in the cylindrical component 47. Functional component 65 may be any one of: a valve, such as a pressure relief valve or a multifunctional valve, an outlet, a sensor, a thermal pressure relief valve, a pressure sensor, a temperature sensor, an over-pressure relief valve, an adaptor part, a fitting part, a closure part, etc.

Figure 5:
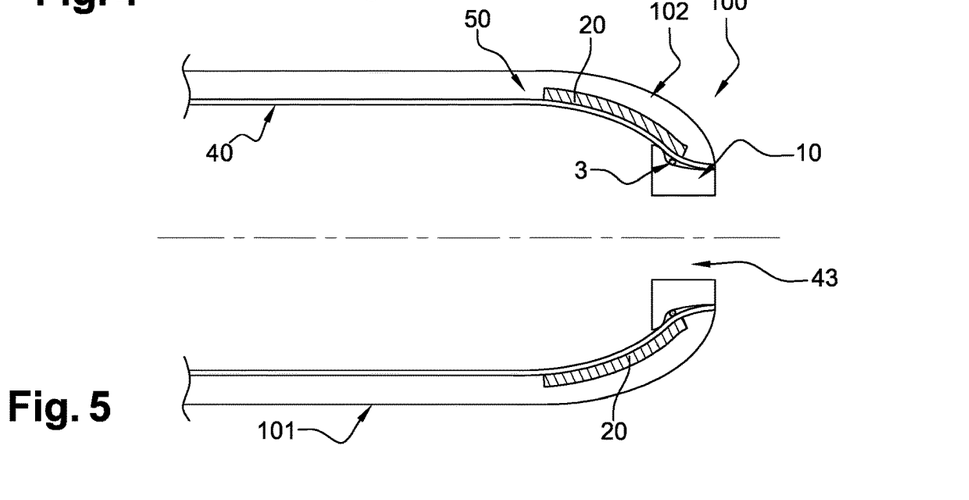

In the pressure vessel 100 of FIG. 5, the pressure vessel 100 is provided with an internal boss 70 inserted into the opening 43 in the liner 40. This internal boss 70 may be made of metal or any other material resisting to the pressure in the pressure vessel, and may be integrated during the blow moulding of the liner 40. In the embodiment of FIG. 5, the pressure vessel 100 does not comprise an external boss. A seal 3 may be provided between an inner perimeter of the liner 40 and the internal vessel adapter 70 such that the opening 43 is suitably sealed.

Figure 7A:
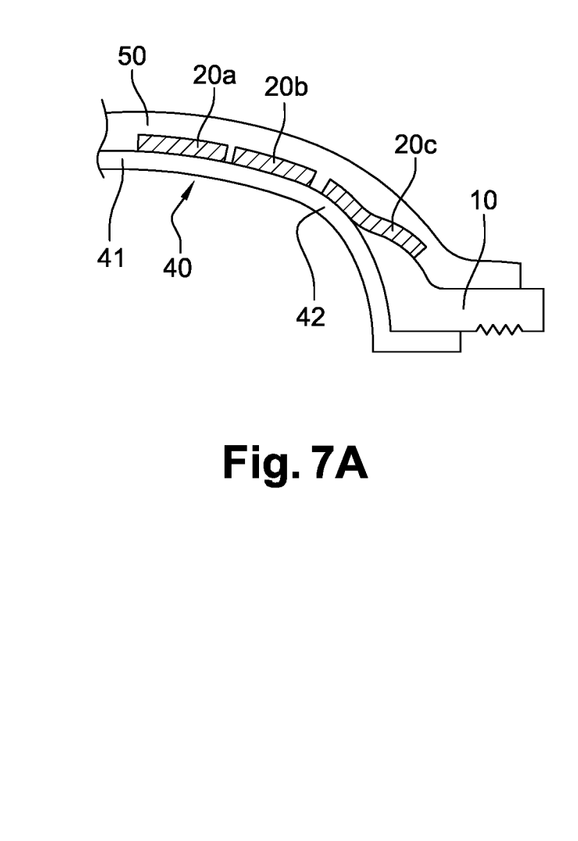
FIGS. 7A and 7B illustrate schematically a cross sections of a portion of a pressure vessel, in accordance with different embodiments of a pressure vessel according to the present invention.
Figure 7B:
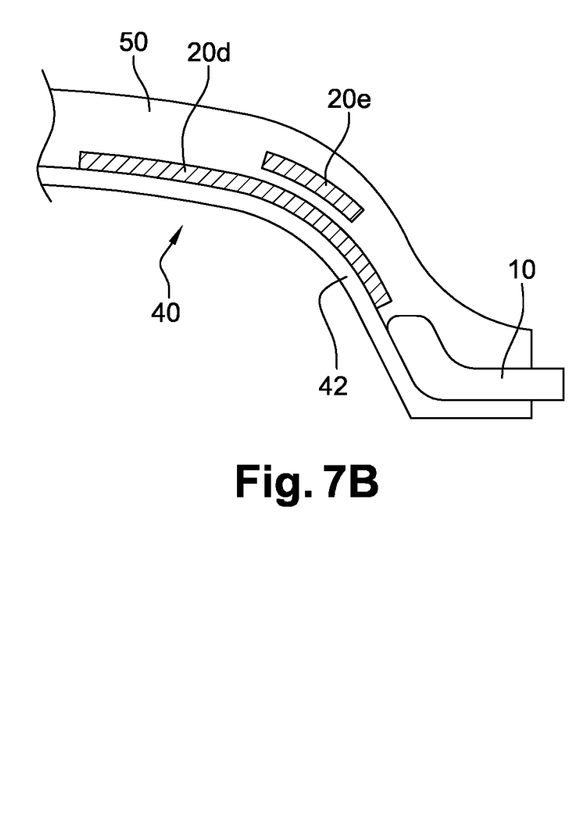

Two further exemplary embodiments are shown schematically in FIGS. 7A and 7B. According to the exemplary embodiment of FIG. 7A, a first, second, and third local reinforcement layer 20a, 20b, 20c are provided adjacent the each other, seen in an axial direction of the pressure vessel, wherein the first, second and third reinforcement layer 20a, 20b, 20c, have different properties, e.g. a different fibre matrix and/or a different thickness, and/or a different fibre content, etc. More generally, there may be provided any number of adjacent local reinforcement layers 20a, 20b, 20c, seen in the axial direction of the pressure vessel. The adjacent local reinforcement layers may have different properties which may be optimized in function of the position on the pressure vessel. In the illustrated embodiment the third local reinforcement layer 20c extends over the boss 10, and the reinforcement structure 50 extends over the entire liner 40, over the first, second and third local reinforcement layer 20a, 20b, 20c, and over the boss 10. In other embodiments (not shown) the third local reinforcement layer 20c will not extend over the boss 10. The first, second and third local reinforcement layer 20a, 20b, 20c may be e.g. pre-preg layers or reinforcement tape layers. The first, second and third local reinforcement layer 20a, 20b, 20c may all be arranged on the first rounded end section 42, wherein e.g. the first local reinforcement layer 20a may extend over small distance over the cylindrical section 41 of the liner 40.

According to the exemplary embodiment of FIG. 7B, there is provided a first local reinforcement layer 20d positioned on the liner 40 or integrated in the liner 40 and a further local reinforcement layer 20e embedded in the reinforcement structure 50. Both the first local reinforcement layer 20d and the second local reinforcement layer 20e surround at least a portion of the same rounded end section 42 and surround less than 20% of the cylindrical section. Such an embodiment may further increase the mechanical strength in certain local areas in function of the desired mechanical strength properties.

In the illustrated embodiments of the invention, the pressure vessel 100 may be configured to store any one of the following: liquid petroleum gas (LPG), hydrogen, compressed natural gas (CNG), ammonia gas.

Figure 6:
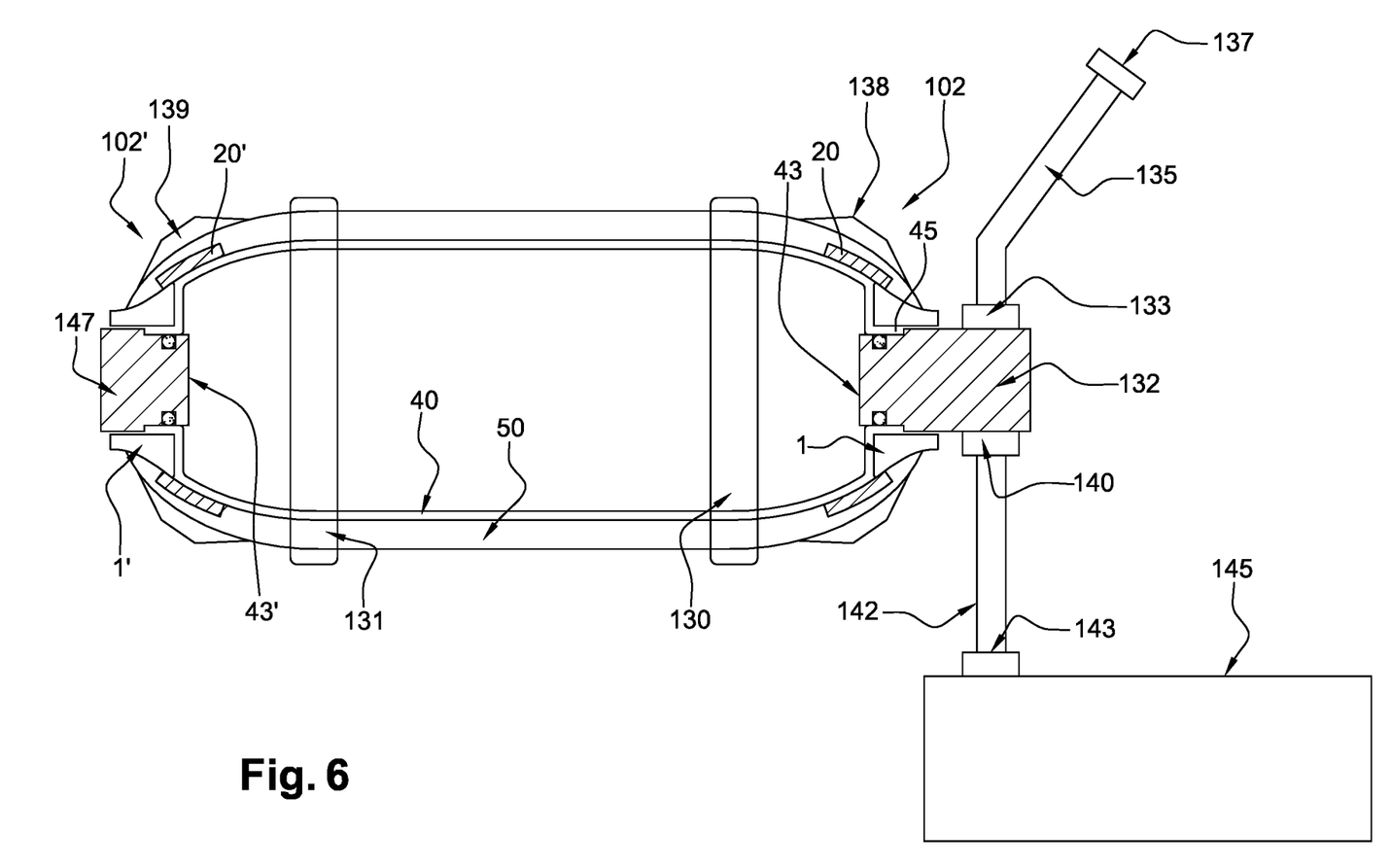
FIG. 6 illustrates schematically a fuel cell system comprising an exemplary embodiment of a pressure vessel according to the invention.

FIG. 6 illustrates an exemplary embodiment of a fuel cell system comprising a pressure vessel 100 which is largely identical to the pressure vessel of FIG. 1. The pressure vessel 100 is formed by a liner 40 surrounded by a reinforcement structure 50 and local reinforcement layers 20, 20'. The pressure vessel 100 has an elongated cylindrical section 101, a first rounded end section 102 and a second rounded end section 102'. The pressure vessel 100 may be provided with shock absorbers 138, 139 at the rounded end sections 102, 102'. Further, there may be provided straps 130, 131 around the cylindrical section 101 of the pressure vessel 100 for fixing the pressure vessel system 100 to a vehicle.

In the pressure vessel system 100 of FIG. 6 there is a first opening 43 in a first rounded end section 42 of the liner 40 and a second opening 43' in a second rounded end section 42' of the liner 40. In other embodiments, only one rounded end section 42 or 42' may be provided with an opening 43 or 43'. A first functional part 132 e.g. comprising a multifunctional valve, e.g. a hydrogen multifunction valve, is arranged in the first cylindrical end section 45 of the liner 40. A second functional part 147, e.g. an auxiliary pressure relief valve, is arranged in the second cylindrical end section 45' of the liner 40.

Figure 3:
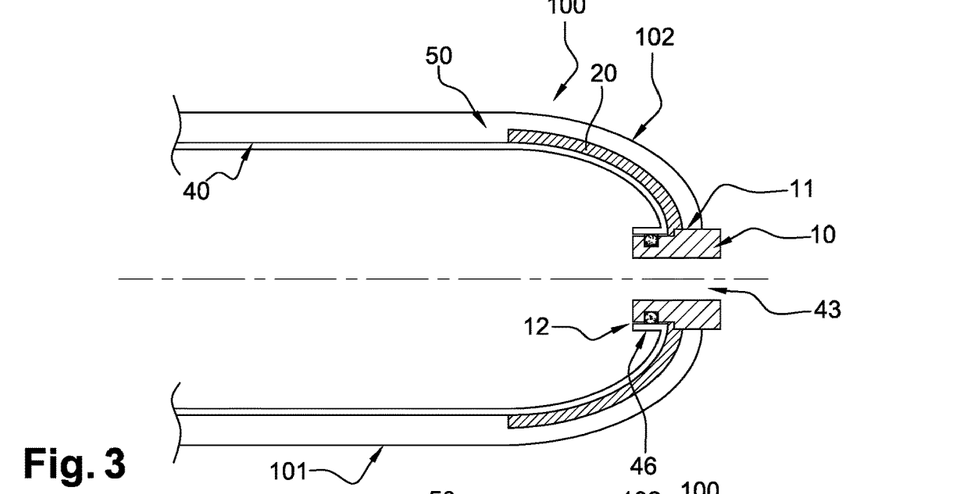
FIGS. 3-5 illustrate schematically cross sections through various exemplary embodiments of a pressure vessel according to the present invention.

In FIG. 6 the mounting of functional part 132 is done using a boss 10, 10' provided around a cylindrical end section 45 protruding outwardly of the liner 40. However, a skilled person understands that the structure of any one of the FIGS. 3-5 is also possible.

The fuel cell system of FIG. 6 further comprises a refuelling interface 137 connected to the multifunctional valve 132 through a refuelling pipe 135, and fuel cell 145 connected to the multifunctional valve 132 through a fuel cell feeding pipe 142.

Whilst the principles of the invention have been set out above in connection with specific embodiments, it is to be understood that this description is merely made by way of example and not as a limitation of the scope of protection which is determined by the appended claims.

The invention claimed is:

1. A pressure vessel configured for storing a fluid under pressure, said pressure vessel comprising:
   a thermoplastic liner comprising a cylindrical section, a first rounded end section and a second rounded end section; said first rounded end section having an opening;
   a reinforcement structure made of a composite material, said reinforcement structure surrounding at least the cylindrical section of the thermoplastic liner;
   a boss with a flange; wherein the flange extends around the opening in the first rounded end section; and
   a local reinforcement layer is embedded in said reinforcement structure, wherein said local reinforcement layer is made of a material different from said reinforcement structure, wherein said local reinforcement layer surrounds at least a portion of the first rounded end section, in an area between the boss and the cylindrical section of the thermoplastic liner, and surrounds less than 20% of the cylindrical section.

2. The pressure vessel of claim 1, wherein the local reinforcement layer is embedded in said reinforcement structure such that composite material of the reinforcement structure extends below and above the local reinforcement layer.

3. The pressure vessel according to claim 1, wherein the local reinforcement layer has a substantially constant thickness.

4. The pressure vessel according to claim 1, wherein the local reinforcement layer is made of a metal or a composite material.

5. The pressure vessel according to claim 1, wherein a maximum outer diameter (Dmax) of the circumferential part formed by the local reinforcement layer is larger than 50% of an outer diameter (D) of the cylindrical section of the liner.

6. The pressure vessel according to claim 1, wherein, seen in an axial direction of the pressure vessel, the first rounded end section has a length L2, and wherein the local reinforcement layer surrounds the first rounded end section at least in a portion of a first zone (Z1) of the first rounded section, said first zone (Z1) extending from the cylindrical section over a length L2/2 in the axial direction of the pressure vessel.

7. The pressure vessel according to claim 1, wherein the local reinforcement layer has a thickness which is smaller than 6 mm.

8. The pressure vessel according to claim 1, wherein the local reinforcement layer comprises reinforcement fibres embedded in a thermoset or thermoplastic matrix; wherein the local reinforcement layer is formed by a thermoplastic or thermoset pre-preg or by a reinforcement tape.

9. The pressure vessel according to claim 1, wherein the reinforcement structure comprises reinforcement fibres embedded in a thermoset or thermoplastic matrix; wherein the reinforcement structure comprises one or more of the following: a filament winding layer, a braided layer, or a tape layer.

10. The pressure vessel according to claim 1, wherein the local reinforcement layer and/or the reinforcement structure extends over the boss.

11. The pressure vessel according to claim 1, wherein a circumferential edge of the opening of the first rounded end section is connected to a cylindrical end section protruding outwardly of the liner, wherein the boss is arranged around the cylindrical end section.

12. The pressure vessel according to claim 1, wherein a circumferential edge of the opening of the first rounded end section is connected to a cylindrical end section protruding inwardly of the liner, wherein the boss has a portion which is arranged in the cylindrical end section, and wherein the flange of the boss protrudes out of the liner, around the opening.

13. The pressure vessel according to claim 1, wherein the first and/or the second rounded end section is substantially dome shaped.

14. The pressure vessel according to claim 1, wherein the pressure vessel is configured to store any one of the following: liquid petroleum gas, hydrogen, compressed natural gas, or ammonia; and wherein the pressure vessel is configured to withstand a pressure above 2 bar.

15. The pressure vessel according to claim 1, wherein a second local reinforcement layer is provided adjacent the local reinforcement layer, seen in an axial direction of the pressure vessel, wherein said second reinforcement layer is different from said local reinforcement layer.

16. A method for manufacturing a pressure vessel, said method comprising:
   forming a thermoplastic liner having a cylindrical section, a first rounded end section and a second rounded end section;
   forming a reinforcement structure made of a composite material such that said reinforcement structure surrounds at least the cylindrical section of the thermoplastic liner; wherein an opening is provided in the first rounded end section;
   arranging a boss with a flange around the opening in the first rounded end section; and
   embedding a local reinforcement layer in said reinforcement structure with said local reinforcement layer made of a material different from said reinforcement structure such that said local reinforcement layer surrounds at least a portion of the first rounded end section in an area between the boss and the cylindrical section of the liner, and surrounds less than 20% of the cylindrical section.

17. The method according to claim 16, wherein the local reinforcement layer is arranged such that it has a thickness which is smaller than 6 mm.

18. The method according to claim 16, wherein the local reinforcement layer is embedded in the reinforcement structure by positioning of the local reinforcement layer between two composite layers of the reinforcement structure.

19. The method according to claim 16, wherein a portion of the local reinforcement layer is embedded in a portion of the reinforcement structure and wherein a thermoset or thermoplastic resin is injected in the reinforcement structure to form the local reinforcement layer and the reinforcement structure.

20. The method according to claim 16, wherein the thermoplastic liner is formed such that the first rounded end section and the second rounded end section are substantially dome-shaped.

* * * * *